United States Patent [19]

Ishida et al.

[11] Patent Number: 4,785,525
[45] Date of Patent: Nov. 22, 1988

[54] MACHINE TOOL FOR COMPLEX MACHINING

[75] Inventors: Kenichi Ishida; Masaki Yoshioka, both of Niigata, Japan

[73] Assignee: Tsugami Corporation, Tokyo, Japan

[21] Appl. No.: 95,719

[22] Filed: Sep. 14, 1987

[30] Foreign Application Priority Data

Sep. 12, 1986 [JP] Japan ................................ 61-213763

[51] Int. Cl.[4] ........................ B23Q 3/157; B23B 7/14
[52] U.S. Cl. ..................................... 29/568; 29/27 R
[58] Field of Search .................... 29/568, 26 A, 27 R, 29/27 A, 27 C, 39, 40; 82/2 R, 2 B, 2 D

[56] References Cited

U.S. PATENT DOCUMENTS

| 4,006,518 | 2/1977 | Rudolph et al. | 29/27 R |
| 4,286,483 | 9/1981 | Henneberg et al. | 82/2 R |
| 4,428,109 | 1/1984 | Seeger | 29/568 |
| 4,571,796 | 2/1986 | Sellner et al. | 29/568 X |

FOREIGN PATENT DOCUMENTS

| 378710 | 2/1985 | Austria | 29/568 |
| 192221 | 8/1986 | European Pat. Off. | 29/27 A |
| 1602818 | 5/1970 | Fed. Rep. of Germany | 29/568 |
| 2033026 | 6/1970 | Fed. Rep. of Germany | 29/27 R |
| 1602810 | 4/1980 | Fed. Rep. of Germany | 29/568 |
| 3344824 | 6/1985 | Fed. Rep. of Germany | 29/27 R |
| 6936306 | 10/1969 | France | 29/27 R |
| 8210611 | 6/1982 | France | 29/27 R |
| 238755 | 9/1986 | German Democratic Rep. | 29/568 |
| 563220 | 6/1977 | U.S.S.R. | 29/568 |

OTHER PUBLICATIONS

European Search Report #EP 87111637.2.

Primary Examiner—William R. Briggs
Attorney, Agent, or Firm—Sughrue, Mion, Zinn, Macpeak & Seas

[57] ABSTRACT

A machine tool comprising a table on which a spindle holding the workpiece moves in horizontal direction along the workpiece. A tool post is sidewardly movable toward the table. An arbor head is connected to the end of the post and is both axially and circumferentially movable. The arbor head includes a powered arbor for holding and possibly rotating a tool. The result is that the workpiece is movable in one direction and the arbor support is movable in two other orthogonal directions as well as being rotatable. Thereby, a variety of complex machining operations may be performed. A tool magazine and an automatic tool changer are provided.

4 Claims, 3 Drawing Sheets

MACHINE TOOL FOR COMPLEX MACHINING

BACKGROUND OF THE INVENTION

Field of the Invention

The present invention relates to a machine tool capable of performing complex machining, or performing not only turning but also some work of a machining center.

Background of the Invention

A complex-machining machine tool capable of performing various kinds of machining such as turning and some work of a machining center has been recently developed as disclosed in the Japanese Patent Applications (OPI) No. 227343/84, No. 227345/84 and No. 56840/85 (the term "OPI" as used herein means an "unexamined published application").

In such a complex-machining machine tool disclosed in the Japanese Patent Application (OPI) No. 227343/84, a headstock is secured to a bed, and a saddle rotatably supporting a tool post is supported on the bed so that the saddle can be moved in the direction of a Z-axis coincident with the axis of a spindle and can also be moved in the direction of an X-axis perpendicular to the Z-axis. The axis of rotation of the tool post crosses the Z-axis at an angle of 45°. A turning tool and a rotary tool are attached to the tool post so that the tools extend perpendicularly to each other. The tool post is moved in the directions of the Z-axis and the X-axis to perform prescribed machining on a workpiece held on the spindle. At that time, the tool post can be rotated by an angle of 180° to machine both the front and side of the workpiece by the single rotary tool or turning tool.

In a complex-machining machine tool disclosed in the Japanese Patent Application (OPI) No. 227345/84 and capable of performing the same machining as that disclosed in the Japanese Patent Application (OPI) No. 22343/84, a tool magazine is provided so that it can be moved in the direction of a Z-axis (coincident with the axis of a spindle) synchronously with a saddle supporting a tool post. To change a tool, the saddle is moved only in the direction of an X-axis.

In a complex-machining machine tool disclosed in the Japanese Patent Application (OPI) No. 56840/85, a headstock is secured on a bed, and a turret-type tool post is provided on the bed so that the tool post can be moved in the direction of a Z-axis coincident with the axis of a spindle and be moved in the direction of an X-axis perpendicular to the Z-axis. A rotary tool and a turning tool are attached in symmetric positions to the tool post. A tool magazine is provided at one end of the bed. A first tool changer is provided at the tool magazine. A second tool changer is provided at the tool post. A changing carrier is provided between the first and the second tool changers. As result, tools can be changed for each other without much moving the tool post in the direction of the Z-axis.

However, the above-described conventional complex-machining machine tools have problems such as described below. Since the tool post of each of the machine tools is moved only in the directions of the X-axis and the Z-axis, special machining such as oblique boring and boring off the axis of the spindle cannot be performed although simple machining can be performed on the front and side of a workpiece. Particularly, although complex-machining machine tools (turning centers) have been recently built as flexible machining systems desired to be capable of performing various kinds of machining, the above-described conventional machine tools cannot meet the desire.

Since each of the conventional complex-machining machine tools have the tool magazine usually at the end of the bed in the direction of the Z-axis, the tool post needs to be moved in the direction from a turning position to the tool magazine at the end of the bed in order to change tools for each other. For that reason, it is time-consuming to exchange the tools for each other. The length of the movement of the tool post in the direction of the Z-axis is elongated according to the complexmachining machine tool becoming large, so that it is more time-consuming to move the tool post in the direction of the Z-axis and to exchange the tools.

In the complex-machining machine tool disclosed in the Japanese Patent Application (OPI) No. 227345/84, the tool magazine can be moved in order to quickly change the tools for each other. For such purpose, however, a mechanism for moving the tool magazine of large weight is needed. Besides, it is dangerous to move the tool magazine fitted with tools.

In the complex-machining machine tool disclosed in the Japanese Patent application (OPI) No. 56840/85, the two tool changers are provided in order to shorten the time of the tool changing. However, since the two tool changers are provided and the changing carrier is needed, the tooling space is reduced due to the presence of the tool changers and the changing carrier and the machine tool is enlarged.

SUMMARY OF THE INVENTION

Accordingly, it is an object of the present invention to provide a complex-machining machine tool which does not have the above-described problems.

The complex-machining machine tool of the present invention comprises a bed extending along a horizontal Z-axis and a table movable on the bed and supporting a headstock holding and rotating workpiece about the Z-axis. A column extends from the bed along an orthogonal X-axis. An X-axis slider slides along the column. A Y-axis slider slides on the X-axis slider along an orthogonal Y-axis. An arbor head is attached to the end of the Y-axis slider and can rotate about the Y-axis with the tool holding arbor facing radially away from the Y-axis. A tool magazine and automatic tool changer is provided.

DETAILED DESCRIPTION OF THE PREFERRED EMBODIMENTS

A preferred embodiment of the present invention is hereafter described with reference to the drawings attached hereto.

Figure 1:
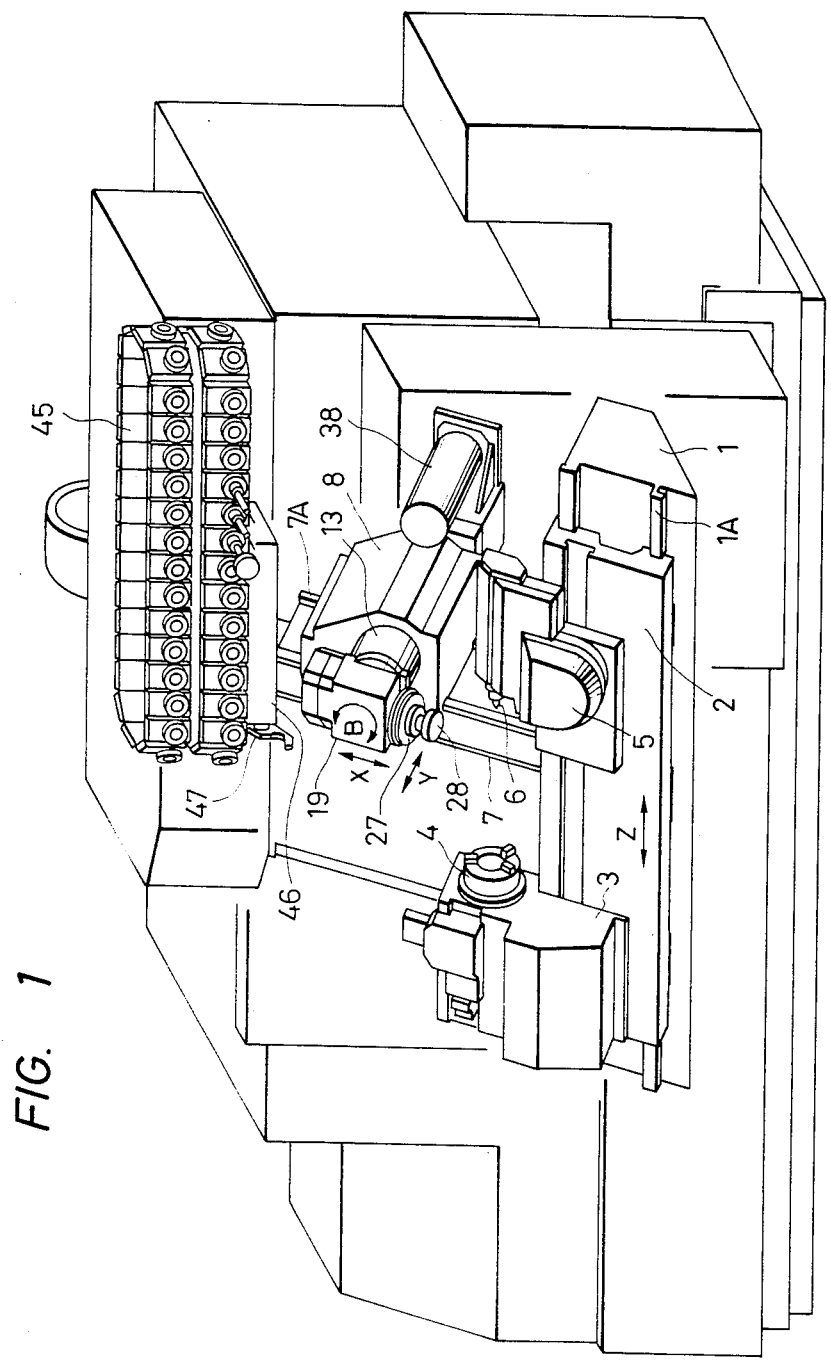
FIG. 1 shows a perspective schematic view of a complex-machining machine tool which is an embodiment of the present invention.
Figure 2:
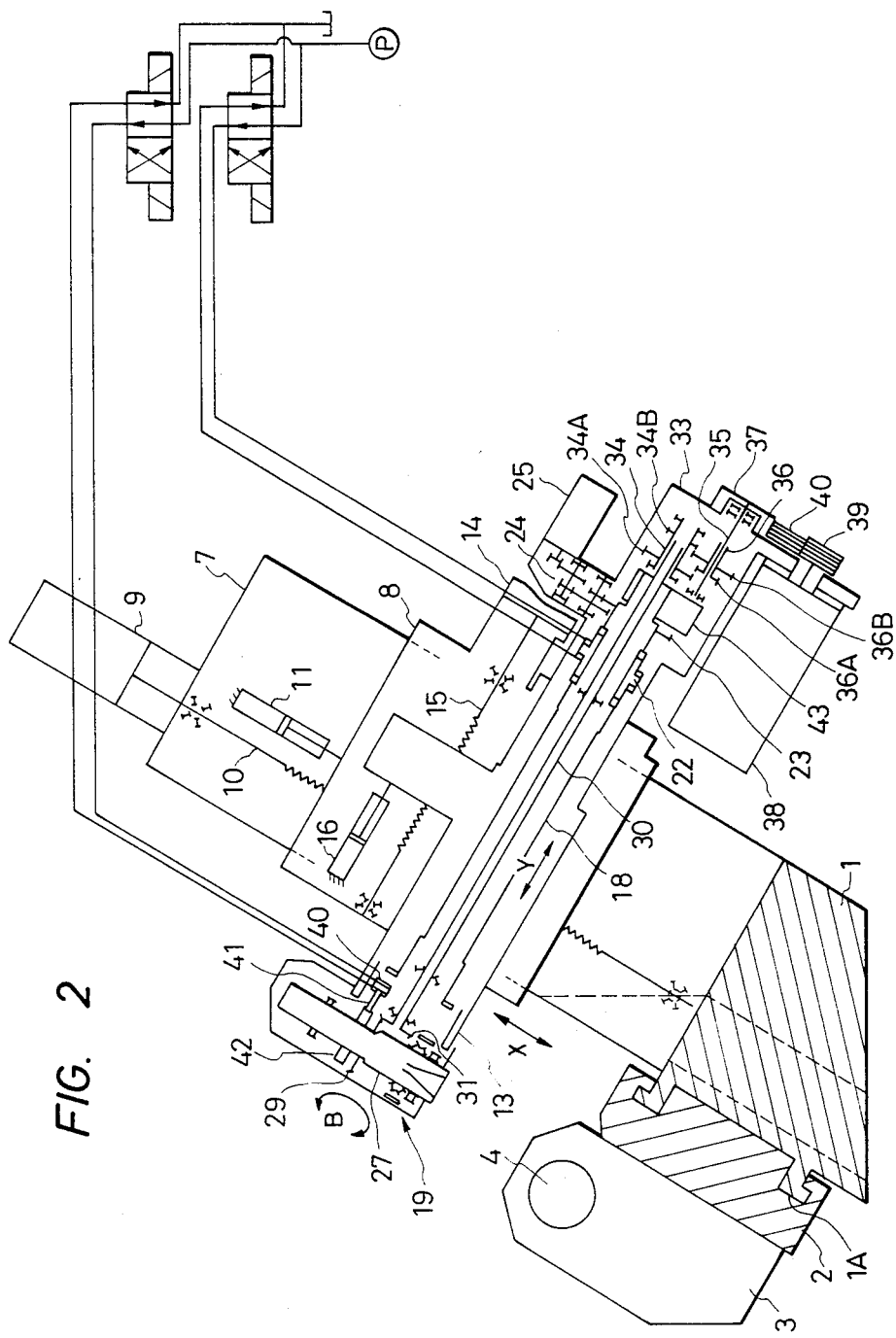
FIG. 2 shows a schematic sectional view of the drive system of the complex-machining machine tool.

As shown in FIGS. 1 and 2, a bed 1 is provided at the front of the complex-machining machine tool and has an inclined guide surface 1A extending on the front of the bed in the direction of a Z-axis. The guiding surface of the bed is inclined at an angle of about 60° to the horizontal. A table 2 is slidably supported on the guide surface 1A. A Z-axis driver (not shown in the drawings) comprising a Z-axis servomotor and a feed screw means for driving the table in the direction of the Z-axis is attached to the table 2.

A headstock 3 for holding a workpiece is mounted on the table 2 and supports a spindle 4 extending in the direction of the Z-axis. A driver for rotating the spindle 4 at a prescribed speed to turn the workpiece and an indexing mechanism for indexing the spindle 4 at prescribed rotational positions are connected to the spindle 4.

A tailstock 5 having a center 6 coaxial with the spindle 4 is supported on the table 2 so that the tailstock 5 can slide in the direction of the Z-axis. For that reason, the distance between the spindle 4 and the center can be altered depending on the size of the workpiece.

A column 7 is provided so that it extends perpendicularly to the bed 1. The column 7 has a guide surface 7A inclined to a vertical plane and extending in the direction of an X-axis perpendicular to the Z-axis. An X-axis slider 8 is supported on the guide surface 7A so that the slider 8 can be slid in the direction of the X-axis An X-axis driver comprising an X-axis servomotor 9 and a feed screw means 10 is connected to the X-axis slider 8. An X-axis balancer 11 for assisting the X-axis slider 8 to be smoothly moved obliquely to a horizontal line is also connected to the X-axis slider 8.

Figure 3:
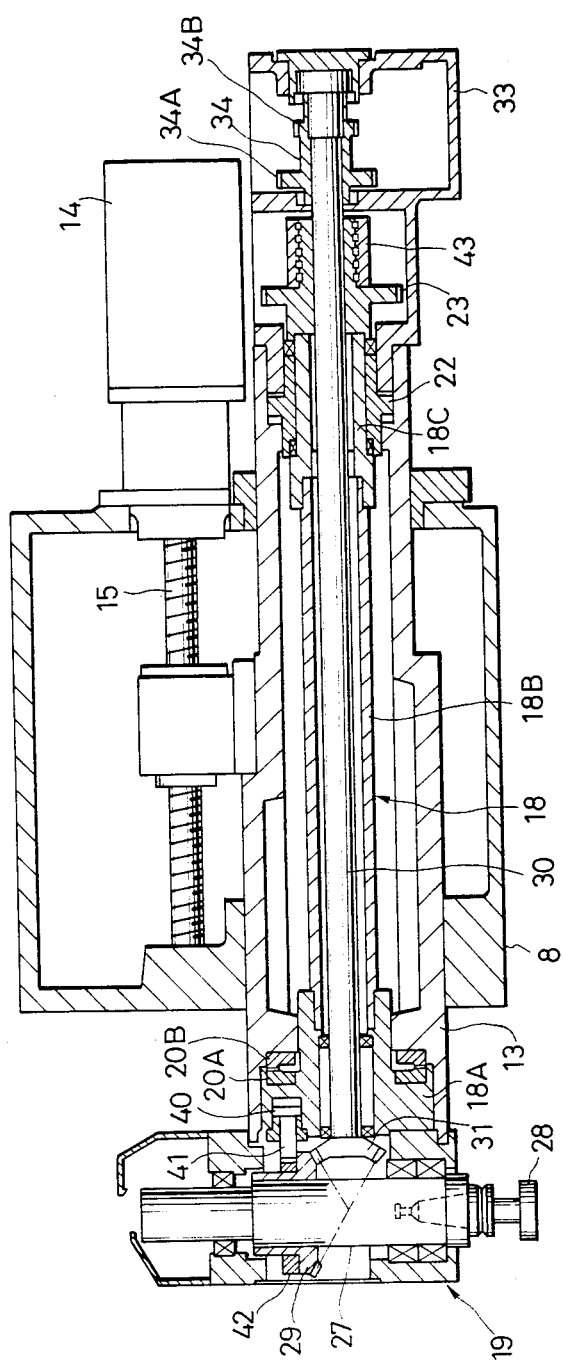
FIG. 3 shows a sectional view of the Y-axis slide of the complex-machining machine tool and the vicinity of the Y-axis slider.

A cylindrical Y-axis slider 13, shown in more detail in FIG. 3, is supported by the X-axis slider 8 so tha the Y-axis slider 13 can be slid in the direction of a Y-axis perpendicular to both the X-axis and the Z-axis. A Y-axis driver comprising a Y-axis servomotor 14 and a feed screw means 15 is connected to the Y-axis slider 13. Since the Y-axis slider 13 is also moved as it remains inclined to a horziontal plane, a Y-axis balancer 16 is connected to the Y-axis slider 13 to assist it to be smoothly moved.

A B-shaft 18 having an axis extending in the direction of the Y-axis is supported in the Y-axis slider 13 so that the B-shaft 18 can be rotated and be slid in its axial direction thereof. The B-shaft 18 comprises, as shown in FIG. 3, a tip portion 18A, a connecting portion 18B and a butt portion 18C. A tool arbor head 19 is attached to the tip portion 18A.

Coupling members 20A and 20B, which can be optionally engaged with and disengaged from each other, are provided on the respective surfaces of the tip portion 18A and of the Y-axis slider 18, which face each other in the direction of the Y-axis. The coupling members 20A and 20B have a large number of teeth and grooves which can be engaged with each other. When the coupling members 20A and 20B are engaged with each other, the B-shaft 18 is prevented from rotating. When the coupling members 20A and 20B are disengaged from each other, the B-shaft 18 is allowed to rotate. The number of the teeth of each of the coupling members 20A and 20B and the positions of the teeth are determined depending on the rotation-stopped position (indexed position) of the B-shaft 18 or on the indexed position of the tool arbor head 19. In the present embodiment, the tool arbor head 19 can be indexed by angular increments of 1°.

A cylinder-piston mechanism 22 is provided at the butt portion 18C of the B-shaft 18. The cylinder-piston mechanism 22 functions to move the B-shaft 18 back and forth in its axial direction relative to the Y-axis slider 13 to thereby engaged or disengage the coupling members 20A and 20B with or from each other.

A gear 23 is attached to the butt of the B-shaft 18 and, as shown in FIG. 2, is connected to an indexing motor 25 through a gear train 24. The indexing motor 25, the gear train 24, the gear 23 and so forth constitute a B-shaft indexing mechanism for indexing the B-shaft 18 to a prescribed rotational position.

A tool arbor 27 having an axis perpendicular to that of the B-shaft 18 is rotatably supported by the tool arbor head 19. A selected tool 28 such as a turning tool and a rotary tool can be attached to the tip of the tool arbor head 27. A bevel gear 29 is mounted on the tool arbor 27.

A drive shaft 30 is rotatably supported in the B-shaft 18 coaxially with the B-shaft 18. Another bevel gear 31, which is engaged with the bevel gear 29 on the tool arbor 27, is attached to the top end of the drive shaft 30.

A tool arbor gearbox 33 is secured to the rear end of the Y-axis slider 13. A hollow drive shaft 34 fitted with a large and a small gear 34A and 34B is rotatably supported by the tool arbor gearbox 33. The rear end of the drive shaft 30 is inserted into the hollow drive shaft 34 so that the drive shaft 30 can be moved in its axial direction relative to the drive shaft 34 but torque is nonetheless transmitted between both the drive shafts 30 and 34.

As shown in FIG. 2, an intermediate shaft 35 parallel with the hollow drive shaft 34 is also rotatably supported by the tool arbor gearbox 33. A movable shaft 36 fitted with a small and a large gear 36A and 36B, which are engaged with the large and small gears 34A and 34B on the hollow drive shaft 34, is movably supported by the intermediate shaft 35. A pulley 37 is provided at an end of the intermediate shaft 35 and connected through a belt 40 to a pulley 39 attached to a tool arbor motor 38 secured to the tool arbor gearbox 33.

The rotation of the tool arbor motor 38 is transmitted to the intermediate shaft 35 to rotate the drive shaft 30 at a different speed by engaging the small gear 36A on the movable shaft 36 with the large gear 34A on the hollow drive shaft 34 or engaging the large gear 36B on the movable shaft 36 with the small gear 34B on the hollow drive shaft 34, to rotate the tool arbor 37. A tool arbor driver for rotating the tool arbor 27 is thus constituted by the tool arbor motor 38, the intermediate shaft 35, the movable shaft 36, the hollow drive shaft 34, the drive shaft 30, the bevel gears 29 and 31 and so forth.

As shown in FIG. 3, a cylinder-piston mechanism 40 and a pin 41, which can be protruded toward the tool arbor head 19 by the cylinder-piston mechanism, are provided in the face of the tool arbor head. The tool arbor 27 is fitted with a ring 42 having a groove, in which the pin 41 can be engaged to keep the tool arbor 27 from rotating. The pin 41 and the ring 42 constitute a locking mechanism for keeping the tool arbor 27 from rotating when a turning tool is in use.

As shown in FIGS. 2 and 3 a rotary coupling 43 through which oil is supplied to the B-shaft 18 is provided with passages (not shown in the drawings) for supplying the oil to bearings and so forth.

As shown in FIG. 1, a tool magazine 45 is provided over the column 7 and has two endless tracks. Various kinds of tools such as turning tools and rotary tools are held in the tool magazine 45. The tools are provided with tapered shanks of the same form so that the tools can be interchangeably attached to the single tool arbor 27.

An automatic tool changer 46 and an automatic tool change arm 47 are provided in prescribed positions on the tool magazine 45. The automatic tool change arm 47 can be rorated about an axis parallel with the axis of a tool held by the tool magazine 45 located in a tool changing position and be moved in the axial direction of the arm. This axis is parallel to the Z-axis. The arm 47 simultaneously grasps both the tool held by the tool magazine 45 and a tool held by the tool arbor head 19 moved to a tool changing position, the tool arbor head 19 having been rotated so that its tool 28 lies along the Z-axis with its free end facing the left in FIG. 1. The arm 47 is then moved forth so that the arm 47 pulls out both the tools. The arm 47 is then rotated by an angle of 180° and moved back to cause the opposite tools to be held by the tool arbor head 19 and the tool magazine 45, thus exchanging the tools for each other. The tool changer 46 may be a conventional one.

The complex-machining machine tool is provided with a numerical controller for numerically controlling the indexing of the spindle 4, the feed of the table 2, the X-axis slide 8, the Y-axis 13, etc., the indexing of the tool arbor head 27, and so forth.

The operation of the complex-machining machine tool is described from now on.

(1) Tool changing

Various kinds of tools are held by the tool magazine 45, as described above, so that a desired tool is moved to a tool changing position near the automatic tool change arm 47 by rotatively indexing the tool magazine. At that time, the X-axis slider 8 is returned to an original position near the tool magazine 45, the Y-axis slider 13 is returned to an original position, and the B-shaft 18 is returned to such an original position that the axis of the tool held by the tool arbor 27 supported in the tool arbor head 19 is parallel with the axis of rotation of the automatic tool change arm 47. The tool arbor 27 is thus put into a tool changing position. The tools held by the tool magazine 45 and the tool arbor 27 are then exchanged for each other.

(2) Ordinary turning (peripheral surface cutting)

A turning tool is attached to the tool arbor 27. The pin 41 is engaged in the groove of the ring 42 by the cylinder-piston mechanism 40 to keep the tool arbor 27 from rotating. The tool arbor head 19 is normally indexed and secured in such a position that the axis of the tool is perpendicular to that (Z-axis) of the workpiece. The workpiece is supported by the spindle 4 and the center 6. After that, the spindle 4 is rotated by an unillustrated motor. The depth of the cutting of the workpiece is set by moving the X-axis slider 8 in the direction of the X-axis. The table 2 supporting the headstock 3 and the tailstock 5 is moved by unillustrated drive and gear means in the direction of the Z-axis to feed the workpiece to cut it.

(3) Special machining

1. Boring, drilling and tapping (a) To perform such machining in the radial direction of the workpiece, a boring tool, a drill or a tap is used in a state as shown in FIG. 1. After the spindle 4 is indexed to place the workpiece in a predetermined angular position, the spindle 4 is stopped and the pin 41 is disengaged out of the groove of the ring 42 so that the tool arbor 27 can be rotated by the tool arbor driver. Cutting feed is performed by moving the X-axis slider 8 in the direction of the X-axis. The position of the machining is set by moving the table 2 in the direction of the Z-axis and the Y-axis slider 13 in the direction of the Y-axis. Since the tool 28 can be moved in the direction of the Y-axis, the workpiece can be machined off its axis defined by the spindle 4 and center 6.

(b) To perform the above-mentioned type of machining on the end face of the workpiece in the axial direction thereof, the B-shaft 18 is indexed to rotate the tool arbor head 19 by an angle of 90° from a position shown in FIG. 1, to render the tool arbor 27 and the tool 28 horizontal (parallel with the Z-axis). The tool arbor 27 is then rotated to perform the machining. Cutting feed is performed by moving the table 2 in the direction of the Z-axis. The position of the end face machining is set by moving the X-axis slider 8 in the direction of the X-axis and the Y-axis slider 13 in the direction of the Y-axis. Since the position of the tool can be adjusted in both the directions of the X-axis and the Y-axis, the machining can be performed in an arbitrary position on the end face of the workpiece.

(c) To machine an oblique hole in the peripheral surface or end face of the workpiece, the B-shaft 18 is rotated to index the tool arbor head 19 by an angle corresponding to that of the obliqueness of the hole, and the movement of the table 2 in the direction of the Z-axis and that of the X-axis slider 8 in the direction of the X-axis are synchronized with each other to perform cutting feed. The position of the oblique hole is set by moving the Y-axis slider 13 in the direction of the Y-axis.

2. Milling of peripheral surface of the workpiece

The workpiece is indexed by the spindle 4. A milling tool is held by the tool arbor 27 and is rotated by the arbor 27 to cut the peripheral surface of the workpiece. The axis of the tool arbor 27 is kept perpendicular to that of the workpiece. The depth of the cutting of the workpiece is set by moving the X-axis slider 8 in the direction of the X-axis. Cutting feed is performed by moving the Y-axis slider 13 in the direction of the Y-axis. The position of the cutting is set by moving the table 2 in the direction of the Z-axis. The depth of the cutting can be altered by the X-axis slider 8 during the cutting, to provide the workpiece with a plurality of flat steps.

3. Milling of end face of the workpiece

A milling tool is held by the tool arbor 27. The B-shaft 18 is indexed to place the axis of the tool arbor head 19 parallel with the Z-axis. The depth of the cutting of the workpiece is set by moving the table 2 in the direction of the Z-axis. A cutting feed is performed by moving the X-axis slider 8 or the Y-axis slider 13 depending on the desired shape of cut.

4. Pyramid

A milling tool is held by the tool arbor 27. The axis of the tool arbor 27 is set at a predetermined degree of obliqueness by indexing the B-shaft 18. The cutting feed is then performed by synchronizing the movement of the table 2 in the direction of the Z-axis and that of the X-axis slide 8 in the direction of the X-axis with each other.

Although the major processes of machining by the complex-machining machine tool are described above, the machine tool is not confined thereto but can perform other various kinds of machining. Since the X-axis, the Y-axis, the Z-axis, the axis (B-axis) of the B-shaft and the axis (C-axis for the rotational angle of the spindle) of the spindle can be used as control axes for the machine tool, it can perform all the kinds of machining on all the sides of the workpiece except its side facing the spindle.

The complex-machining machine tool described above has various effects as follows:

(1) Since the tool arbor head holding the tool can be moved in the directions of the X-axis, the Y-axis and the B-axis and the workpiece held by the spindle can be moved in the direction of the Z-axis because of the action on the bed, the toola and the workpiece can be very complexly moved to enable very complex machining. Especially, the milling capacity of the machine tool is much increased by the addition of the Y-axis for control.

(2) Since the tool magazine is provided over the column and the headstock is moved in the direction of the Z-axis, tools can be changed for each other only by returning the X-axis slider, the Y-axis slider and the B-shaft. For that reason, the tools can be changed for each other in a very short time. Since a tool post needs to be returned to an original position in the direction of a Z-axis in a conventional machine too, it takes much time to change tools for each other therein. However, according to the present invention, it is unnecessary to return the tool post to the original position to exchange the tool for each other. For that reason, it is also unnecessary to provide a changing carrier and two tool changers as in the conventional machine tool to quickly exchange the tools for each other. As a result, the complex-machining machine tool provided in accordance with the present invention can be mde compact and the constitution of the machine tool can be simplified.

(3) Since the headstock is moved in the direction of the Z-axis but the tool is not moved in that direction, the position of cutting of the workpiece is not moved in that direction. For that reason, cut chips, cutting oil and so forth drop only to a chip receiver on the bed under the X-axis slider so that it is easy to dispose of the chips. It is preferable to provide the table in an inclined position as shown in FIG. 1, to facilitate the collection of the chips and so forth.

(4) Since the headstock is moved in the direction of the Z-axis, a robot does not need to be moved in the direction of the Z-axis even when a long workpiece is supplied by the robot. Therefore, the cost of the robot can be made lower. When only the tip of a long workpiece is to be machined on a conventional numerically-controlled lathe and supplied by a robot, the robot holding the workpiece is moved in the direction of the Z-axis of the lathe and the workpiece is inserted through the hole of the spindle of the lathe and then chucked at the spindle. On the other hand, the headstock is moved in the axial direction of the spindle of the complex-machining machine tool provided in accordance with the present invention, the robot is only required to hold the workpiece and move in the direction of the X-axis of the machine tool until the axis of the workpiece coincides with that of the spindle.

(5) Since the tool magazine is provided over the column or emplaced in an upper position on the machine tool, the area for installing the machine tool does not need to be increased. Therefore, the degree of utilization of the space around the machine tool is high. The tool magazine can be provided with a plurality of tracks at different levels so that a large number of tools can be housed in the tool magazine along the tracks. For that reason, the expandability of the capacity of the tool magazine is high, and it is easy to build the machine tool as a flexible machining system.

What is claimed is:

1. A machine tool for complex machining, comprising:
    a bed;
    a table which can be moved relative to said bed in the direction of a horizontal Z-axis;
    a Z-axis driver for moving said table back and forth in the direction of said Z-axis;
    a workpiece-holding headstock support-on said table so that an axis of said headstock extends in the direction of said Z-axis;
    a column secured to said bed and having a guide surface extending in the direction of an X-axis perpendicular to said Z-axis;
    an X-axis slider movably supported on said guide surface of said column;
    an X-axis driver for moving said X-axis slider back and forth in the direction of said X-axis;
    a Y-axis slider supported by said X-axis slider so that said Y-axis slider can be moved in the direction of a Y-axis perpendicular to said X-axis and to said Z-axis;
    a Y-axis driver for moving said Y-axis slider back and forth in the direction of said Y-axis;
    a B-shaft rotatably supported by said Y-axis slider so that said B-sahft can be rotated about said Y-axis;
    a tool arbor head which is attached to an end of said B-shaft and fitted with a rotatable tool arbor; and
    a tool arbor driver for rotating said tool arbor.

2. A machine tool is recited in claim 1:
    wherein said rotatable tool arbor is supported rotatably with a rotation axis perpendicular to said Y-axis and is provided with a locking mechanism for keeping said tool arbor from rotating; and
    further comprising a B-shaft indexing mechanism for indexing said B-shaft about said Y-axis.

3. A machine tool as recited in claim 2, further comprising:
    a tool magazine provided over said column; and
    a tool changer for changing a tool held in said tool magazine to a tool held by said tool arbor head.

4. A machine tool as recited in claim 3, wherein a guiding surface of said bed on which said table is moved is inclined at an angle of about 60° to the horizontal.

* * * * *